United States Patent
Fabas

(10) Patent No.: US 9,971,734 B2
(45) Date of Patent: May 15, 2018

(54) DEVICE AND METHOD FOR DETERMINING A ROUGH COMPONENT OF A LATITUDE OR LONGITUDE POSITION OF A MOVING CRAFT

(71) Applicant: Airbus Operations (SAS), Toulouse (FR)

(72) Inventor: Nicolas Fabas, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 327 days.

(21) Appl. No.: 14/945,994

(22) Filed: Nov. 19, 2015

(65) Prior Publication Data

US 2016/0147711 A1    May 26, 2016

(30) Foreign Application Priority Data

Nov. 25, 2014   (FR) ...................... 14 61445

(51) Int. Cl.
| | |
|---|---|
| G06F 17/00 | (2006.01) |
| G06F 17/10 | (2006.01) |
| G01C 21/12 | (2006.01) |
| G01C 21/20 | (2006.01) |
| H04L 12/46 | (2006.01) |
| H04L 12/40 | (2006.01) |

(52) U.S. Cl.
CPC ............ *G06F 17/10* (2013.01); *G01C 21/12* (2013.01); *G01C 21/20* (2013.01); *H04L 12/4633* (2013.01); *H04L 2012/4028* (2013.01)

(58) Field of Classification Search
None
See application file for complete search history.

(56) References Cited

U.S. PATENT DOCUMENTS

| 4,017,717 A | 4/1977 | Watt |
| 4,835,537 A * | 5/1989 | Manion ................ G01S 5/0009 340/961 |

(Continued)

FOREIGN PATENT DOCUMENTS

GB    1206694    9/1970

OTHER PUBLICATIONS

French Search Report, dated Sep. 21, 2015.

*Primary Examiner* — Rami Khatib
*Assistant Examiner* — Nicholas K Wiltey
(74) *Attorney, Agent, or Firm* — Greer, Burns & Crain, Ltd.

(57) ABSTRACT

A device and a method for determining a rough component of a latitude or longitude position of a moving craft. The position is reconstructed cyclically by combining the rough component with a corresponding fine component. The device determines the sign of a difference between the fine component for an acquisition cycle and the fine component for a preceding acquisition cycle. The device then computes the rough component corresponding to the given acquisition cycle of the fine component, as a function of the sign of the difference and of the sign and of the value of the speed of the craft. The device and the corresponding method make it possible to extrapolate an unrefreshed rough component as a function of the trend of the fine component and of the sign of the speed of the moving craft to reduce error associated with the computation of the latitude or longitude position.

13 Claims, 6 Drawing Sheets

(56) References Cited

U.S. PATENT DOCUMENTS

| | | | | |
|---|---|---|---|---|
| 7,116,266 | B1* | 10/2006 | Vesel | G01S 13/765 |
| | | | | 342/165 |
| 7,321,305 | B2* | 1/2008 | Gollu | G06Q 10/087 |
| | | | | 340/10.1 |
| 7,782,252 | B2* | 8/2010 | Kang | G01S 19/30 |
| | | | | 342/357.77 |
| 2008/0297411 | A1* | 12/2008 | Kang | G01S 19/30 |
| | | | | 342/357.64 |
| 2011/0178708 | A1* | 7/2011 | Zhang | G01C 21/165 |
| | | | | 701/501 |
| 2011/0228322 | A1* | 9/2011 | Ashikawa | G01C 21/32 |
| | | | | 358/1.15 |
| 2013/0048707 | A1* | 2/2013 | Do | G01C 21/005 |
| | | | | 235/375 |

\* cited by examiner

DEVICE AND METHOD FOR DETERMINING A ROUGH COMPONENT OF A LATITUDE OR LONGITUDE POSITION OF A MOVING CRAFT

CROSS-REFERENCES TO RELATED APPLICATIONS

This application claims the benefit of the French patent application No. 1461445 filed on Nov. 25, 2014, the entire disclosures of which are incorporated herein by way of reference.

FIELD OF THE INVENTION

The present invention is generally concerned with computing the latitude or longitude position of a moving craft.

BACKGROUND OF THE INVENTION

In order to guide an aircraft along its flight path, it is known to use a navigation system that enables the computation of navigation data including the longitude position and the latitude position of the aircraft. Other navigation data such as the bearing, the speed, and the route of the aircraft can also be computed by the navigation system.

This navigation data can be used by systems such as the flight management system (FMS) or the flight control and guidance system (FCGS). The systems using this data enable the aircraft to be guided along its flight path as a function of the navigation data.

Navigation data can be transmitted between the navigation system and the system using the data using different communication means, such as the ARINC 429 bus or the AFDX™ network.

For improved accuracy, it is known to format each longitude or latitude position datum on two words. Thus a first word is used to encode a numerical value corresponding to a coarse component of the position datum, while a second word is used to encode a numerical value corresponding to a fine component of the position datum.

The two words are then combined with each other, for example by the flight management system or the flight control system to reconstruct an accurate value of the latitude or longitude position that is required.

To limit the consumption of computation resources, the coarse component of the position datum may be computed at a frequency lower than that at which the corresponding fine component is computed.

For example, the navigation center may compute the fine component of a position datum every 10 ms and compute the coarse component of that position datum every 20 ms.

FIG. 1 shows a time scale t on which are represented fine components LF1, LF2, LF3, LF4 computed every 10 ms and coarse components LC1 and LC3 computed every 20 ms. It is then apparent that for the second cycle of computation of the fine component, the associated coarse component has not been computed.

In fact, the coarse component that follows the coarse component LC1 is computed at a time t corresponding to the third cycle of computation of the fine component.

Using the FIG. 1 diagram again, FIG. 2 shows the cyclic operation of computation of the position datum by an arrow RCS1, RCS2, RCS3. This operation corresponds to combining at the end of a cycle of computation of the fine component and coarse component pair computed for this cycle. Each pair of components is designated by a brace.

The computation by the system using the latitude or longitude position datum for the second cycle may then include an error.

An object of the present invention is to make it possible to compute accurately the longitude and/or latitude position datum of a moving craft for a given cycle of computation of a fine component of the position datum when the corresponding coarse component has not been computed over this cycle.

SUMMARY OF THE INVENTION

In accordance with one embodiment of the invention, there is proposed a device for determining a coarse component of a latitude or longitude position datum of a moving craft, the position datum being reconstructed cyclically by combining the coarse component acquired cyclically with a corresponding fine component acquired cyclically, characterized in that the device is configured:

to determine the sign of the difference between the fine component for a given acquisition cycle and the fine component for the preceding acquisition cycle;

to determine the sign of the speed of the craft;

to compute the coarse component corresponding to the given cycle of acquisition of the fine component, as a function of the sign of the difference between the fine component for the given cycle and the fine component for the preceding cycle, and as a function of the sign of the speed of the craft.

In accordance with one advantageous feature, the device is configured to compute the coarse component corresponding to the given cycle of acquisition of the fine component, also as a function of the value of the speed of the moving craft.

In accordance with one advantageous feature, for the computation of the coarse component of a latitude position, the device is configured to determine the sign of the speed of the craft along the south-north axis.

In accordance with one advantageous feature, for the computation of the coarse component of a longitude position, the determination device is configured to determine the sign of the speed of the craft along the west-east axis.

In accordance with one advantageous feature, the device is configured to compute the coarse component corresponding to the given cycle of acquisition of the fine component in the cycle, denoted N+1, N being a positive integer, by executing a first algorithm comprising the following computations:

If
    Sign(DfN+1 − DfN) * sign(Gaxis) <0
Then
    DcN+1 = DcN + sign(Gaxis) * (A + 1)
Else
    DcN+1 = DcN + sign(Gaxis) * A DfN+1 being the fine component acquired in the cycle N+1;

DfN being the fine component acquired in the cycle N;

DcN+1 being the coarse component acquired in the cycle N+1;

DcN being the coarse component acquired in the cycle N;

Gaxis being the speed of the craft along the south-north axis for the computation of the coarse component of the latitude or along the west-east axis for the computation of the coarse component of the longitude;

sign(Gaxis) being, for the computation of the coarse component of the latitude, equal to +1 when the moving craft is moving from the south toward the north, and equal to −1 otherwise and, for the computation of the coarse component of the longitude, equal to +1 when the moving craft is moving from the west toward the east, and equal to −1 otherwise;

A being a positive real value computed as follows:
A=Ent(|Gaxis/G0|) Ent( ) being the integer part function
G0=[R0*LSBc]/Te
R0=RT when the datum computed is the latitude position datum along the south-north axis
R0=RT*cos(Latitude) when the datum computed is the longitude position datum along the west-east axis
RT=terrestrial radius
LSBc=angular value of the step for discretization of the coarse component
Te=period of acquisition of the coarse component In accordance with one advantageous feature, the device is configured to determine the value A as a function of the value of the speed of the moving craft.

In accordance with one advantageous feature, the device includes an acquisition module configured to acquire the fine component at a first frequency and to acquire the coarse component at a second frequency lower than the first frequency.

In accordance with one advantageous feature, the device is also configured to compute a corrected coarse component of the position datum corresponding to the given reconstruction cycle, as a function of the difference between the position datum reconstructed for the given reconstruction cycle and the corrected reconstructed position datum for the preceding reconstruction cycle, and as a function of the sign and of the value of the speed of the craft.

In accordance with one advantageous feature enabling correction of problems of asynchronism that can lead to an erroneous position computation, because of the recombination of the fine and coarse components not corresponding to the same cycle of computation, the device is configured to compute the corrected coarse component of the position datum corresponding to the given reconstruction cycle, denoted N+1, N being a positive integer, by executing a second algorithm comprising the following computations:

---
Dtot_corrN = Dc_corrN * LSBc + DfN * LSBf
DtotN+1 = DcN+1 * LSBc + DfN+1 * LSBf
If
    Sign[(DtotN+1 + ε*sign(Gaxis)) − (Dtot_corrN + sign(Gaxis)*Gaxis*Te/R0)]*sign(Gaxis)<0
    OR
    |DtotN+1 + ε*sign(Gaxis) − Dtot_corrN| < |Gaxis * Te / R0|
Then
    If
        Sign(DfN+1 − DfN) * sign(Gaxis) <0
    Then
        Dc_corrN+1 = DcN+1 + sign(Gaxis) * (A + 1)
    Else
        Dc_corrN+1 = DcN+1 + sign(Gaxis) * A
Else
    Dc_corrN+1 = DcN+1
---

DfN+1 being the fine component acquired during the cycle N+1 reconstruction;
DfN being the fine component acquired during the cycle N;

DtotN+1 being the reconstructed position datum estimated in the cycle N+1;
Dtot_corrN being the reconstructed position datum corrected in the cycle N;
DcN+1 being the coarse component acquired during the cycle N+1;
Dc_corrN being the corresponding coarse component corrected in the cycle N;
Dc_corrN+1 being the corrected coarse component corresponding to the cycle N+1;
Gaxis being the speed of the craft along the south-north axis for the computation of the coarse component of the latitude or along the west-east axis for the computation of the coarse component of the longitude;
sign(Gaxis) being, for the computation of the coarse component of the latitude, equal to +1 when the moving craft is moving from the south toward the north, and equal to −1 otherwise and, for the computation of the coarse component of the longitude, equal to +1 when the moving craft is moving from the west toward the east, and equal to −1 otherwise;
ε being a tolerance value;
A being a positive real value computed as follows:
A=Ent(|Gaxis/G0|) Ent( ) being the integer part function
G0=[R0*LSBc]/Te
R0=RT when the computed position datum is the latitude position datum along the south-north axis
R0=RT*cos(Latitude) when the computed position datum is the longitude position datum along the west-east axis
RT=terrestrial radius
LSBf=angular value of the discretization step of the fine component
LSBc=angular value of the discretization step of the coarse component
Te=period of acquisition of the coarse component The first algorithm described above may be executed by assigning the parameter DcN the value of Dc_corrN+1 computed as the output of the second algorithm described above.

In accordance with one advantageous feature, the device is configured to determine the value A as a function of the value of the speed of the moving craft.

There is also proposed a system for moving craft including, on the one hand, a computation system configured to compute cyclically a coarse component of a latitude or longitude position of a moving craft, and to compute cyclically a corresponding fine component, and, on the other hand, a determination device as described above.

In accordance with one advantageous feature of the invention, the computation system is configured to encode the coarse and fine components to the binary format, so that the fine component evolves between 0 and the least significant bit of the coarse component.

There is also proposed a method for determining a coarse component of a latitude or longitude position datum of a moving craft, the position datum being reconstructed cyclically by combining the coarse component acquired cyclically with a corresponding fine component acquired cyclically, characterized in that the method includes the following steps:

determination of the sign of the difference between the fine component for a given acquisition cycle and the fine component for a preceding acquisition cycle;

determination of the sign and of the value of the speed of the craft;

computation of the coarse component corresponding to the given cycle of acquisition of the fine component, as a function of the sign of the difference, and as a function of the sign and of the value of the speed of the craft.

In accordance with one advantageous feature, for the correction of a coarse component of a position datum corresponding to a given reconstruction cycle, the method further includes the following steps:

determination of the sign of the difference between the position datum reconstructed for a given reconstruction cycle and the position datum reconstructed for a preceding reconstruction cycle;

determination of the sign and of the value of the speed of the craft;

computation of the corrected coarse component of the position datum corresponding to the given reconstruction cycle, as a function of the sign of the difference and as a function of the value of the speed of the craft.

There is also proposed a computer program product including program code instructions for the execution of the steps of a method as described above when the program is executed by a processor.

BRIEF DESCRIPTION OF THE DRAWINGS

The invention will be clearly understood on reading the following description of embodiments with reference to the appended drawings in which.

DETAILED DESCRIPTION OF THE PREFERRED EMBODIMENTS

Figure 1:
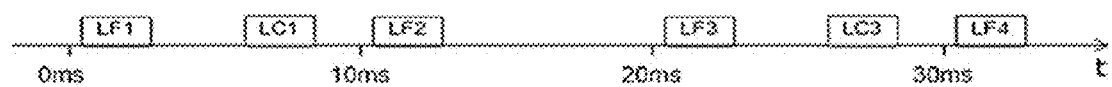
FIG. 1 is a representation along a time axis t of a plurality of cycles of computation and of acquisition of a fine component and the corresponding coarse component as employed in the prior art, the coarse component not being acquired over one of the cycles.
Figure 2:
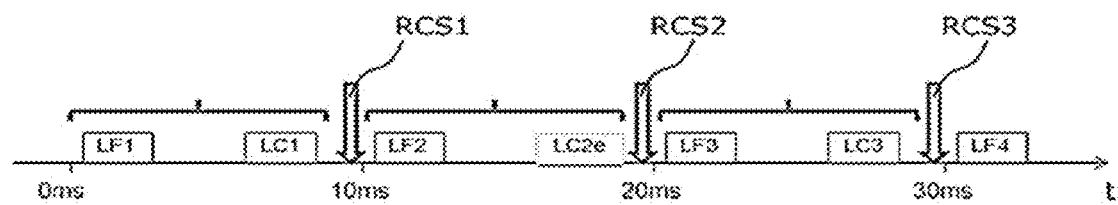
FIG. 2 is a representation along a time axis t of a plurality of cycles of computation and of acquisition of a fine component and the corresponding coarse component as employed in the prior art, the coarse component not being acquired over one of the cycles, but determined using the determination device in accordance with the invention.
Figure 3:
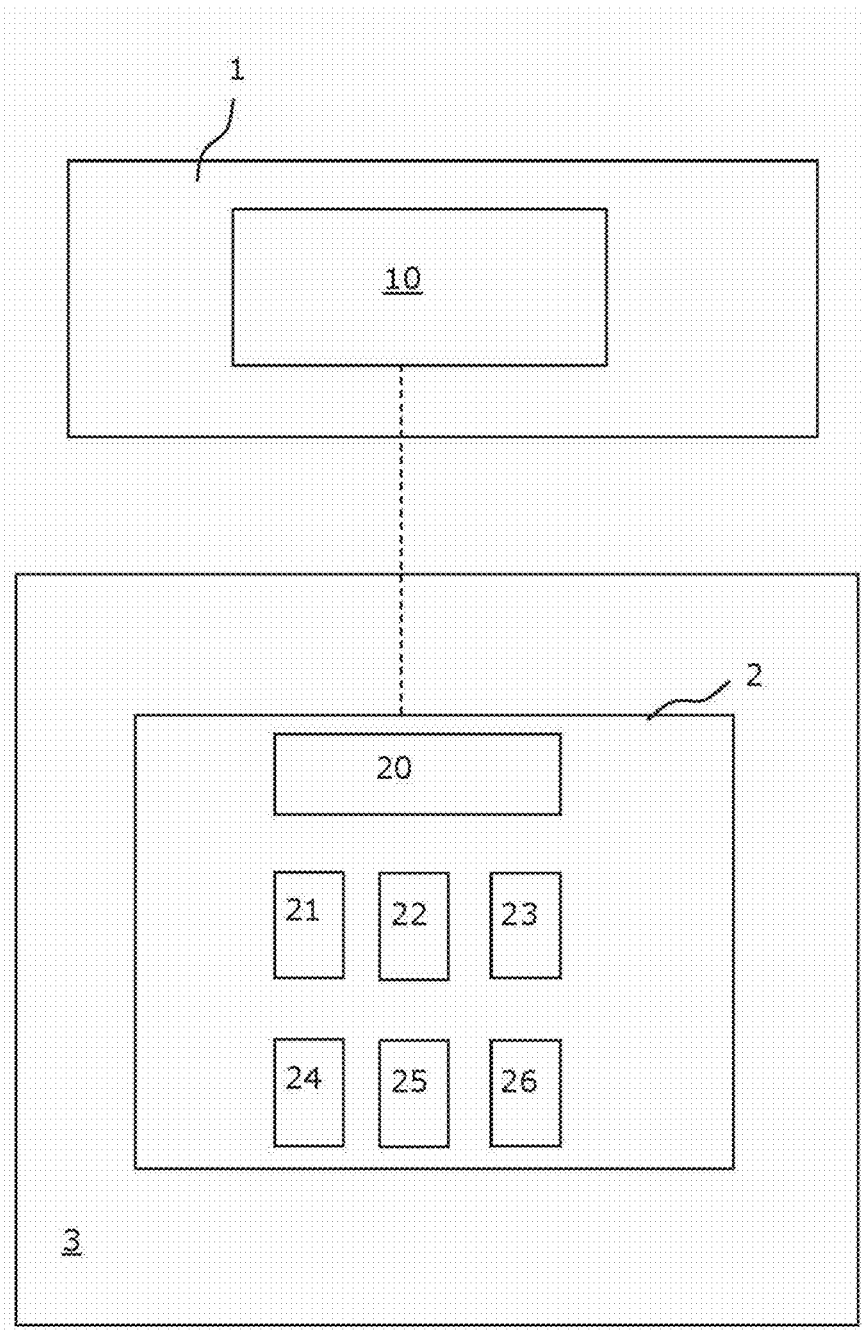
FIG. 3 is a diagram of a computation system including a determination device in accordance with one embodiment of the invention, and a corresponding user system.

A system 1 for computing position data components for a moving craft, such as an aircraft, is described with reference to the figures.

This computation system 1 may be a navigation system that includes a computer 10 configured to compute cyclically a coarse component of a longitude or latitude position datum and a computer, common with the computer 10 or not, configured to compute cyclically a corresponding fine component.

The coarse component is a value that evolves in time with a discretization step greater than that of the fine component. The evolution of each component can of course be upward or downward according to the direction of movement of the moving craft.

In the examples shown in the figures, the position datum is the longitude or latitude position.

The fine and coarse components of the position data are intended to be transmitted by the computation system 1 to a system 3 using such data that enables reconstruction of the corresponding position datum from the fine and coarse components. The user system may be a flight management system or a flight control system of the aircraft, using the position data to guide the moving craft along its path.

The remainder of the description refers to "position datum" whether that means the latitude position or the longitude position when the description applies equally well to the latitude position datum and to the longitude position datum. If a passage of the description applies specifically to the latitude position datum or to the longitude position datum, the terms latitude or longitude are then specified.

There is described hereinafter a coarse component determination device 2. This determination device 2 enables determination of the coarse component of a position datum of the moving craft when, for a given cycle of computation of the fine component, this coarse component has not been computed.

The fine component computed by the computer 10 is acquired by an acquisition module 20 of the determination device 2 at a first frequency. Similarly, the coarse component computed by the corresponding computer is acquired by the acquisition module 20 of the determination device 2 at a second frequency. The user system 3 reconstructs the position datum at a predefined third frequency by combining the fine component with the coarse component.

In the example shown in FIGS. 1 to 10, the frequency of acquisition of the coarse component, i.e., the second frequency, is lower than the frequency of acquisition of the fine component, i.e. the first frequency. Accordingly, in the examples shown in the figures, the duration of each cycle of acquisition of the fine component is 10 ms whereas the duration of each cycle of acquisition of the coarse component is 20 ms.

Moreover, in the example shown in FIGS. 2 to 7 and 9, the frequency of reconstruction of the position is equal to, and synchronized with, the frequency of acquisition of the fine component. As explained hereinafter in the example corresponding to FIGS. 8 and 10, the frequency of reconstruction of the position is equal to, but asynchronous with respect to, the frequency of acquisition of the fine component.

The determination device 2 includes a determination module 21 that determines the sign of the difference between the fine component DfN+1 of a given cycle of computation, denoted N+1, N being a strictly positive natural integer, and the fine component DfN of the preceding cycle of computation N.

The determination device 2 also includes a determination module 22 configured to determine the sign of the speed of the craft.

For computing the coarse component of the latitude, the sign of the speed of the craft is positive when the moving craft is moving from the south toward the north, and negative otherwise. For computing the coarse component of the longitude, the sign is positive when the moving craft is moving from the west toward the east, and negative otherwise.

The device 2 also includes a computer 23 configured to compute the coarse component DcN+1 corresponding to the given cycle N+1 of acquisition of the fine component, in which cycle the coarse component is not sent by the computation system 1, as a function of the sign of the difference between the fine component DfN+1 and the fine component DfN, and as a function of the sign and of the value of the speed of the craft.

In other words, the device 2 enables extrapolation of the value of the coarse component for a given cycle N+1 when the value of the coarse component has not been refreshed over the cycle N+1. In fact, it can happen that the value of the coarse component is not refreshed over the computation cycle N+1, because the frequency of computation or of acquisition of the coarse component is lower than the frequency of computation or of acquisition of the fine component.

The computer 23 of the determination device 2 is configured to determine the coarse component DcN+1 corresponding to the cycle N+1 of acquisition of the fine component, over which cycle the coarse component is not sent by the computation system 1, by executing a first algorithm comprising the following computations:

```
If
    Sign(DfN+1 − DfN) * sign(Gaxis) <0
Then
    DcN+1 = DcN + sign(Gaxis) * (A + 1)
Else
    DcN+1 = DcN + sign(Gaxis) * A
```

The fine and coarse components can be computed without units. The unit is retrieved at the time of the computation for the reconstruction of the total position datum by multiplying the fine and coarse components by the angular values LSBc and LSBf of the discretization steps of the coarse component and the fine component, respectively. We therefore obtain DtotN+1=DcN+1*LSBc+DfN+1*LSBf Gaxis is the speed of the craft along the south-north axis for the computation of the coarse component of the latitude position datum or along the west-east axis for the computation of the coarse component of the longitude position datum. A is a positive real value computed as follows:

A=Ent(|Gaxis/G0|) Ent( ) being the integer part function
G0=[R0*LSBc]/Te
R0=RT for computing the latitude position datum along the south-north axis
R0=RT*cos(Latitude) for computing the longitude position datum along the west-east axis
RT=terrestrial radius
LSBc=angular value of the step for discretization of the coarse component
Te=period of acquisition of the coarse component.

In accordance with one embodiment of the invention, the value of A is equal to 0. The value 0 corresponds to the situation in which the speed of the mobile induces an evolution of the position datum strictly less than the discretization step of the coarse component between two cycles of acquisition of computation of the fine component.

Thanks to such an algorithm, the coarse component not refreshed for a given cycle is therefore extrapolated as a function of the evolution of the fine component and of the speed of the moving craft. Such a device therefore enables extrapolation of the missing coarse component over an acquisition cycle, which enables reconstruction of the required position datum accurately and with a low risk of error.

The computations are effected in the binary system. In particular, the coarse and fine components being encoded to the binary format, the fine component evolves between 0 and the least significant bit of the coarse component.

In accordance with one particular embodiment, the determination device 2 is configured to determine the value A as a function of the value of the speed of the moving craft. The value of A can also be determined as a function of the expected evolution of the position datum over the duration of a cycle. In fact, knowing the speed of the moving craft, the expected evolution of the position datum is obtained as follows: DtotN+1−DtotN=Gaxis*Te/R0

Thus A can be expressed as follows: A=Ent(|DtotN+1−DtotN|/LSBc|)

Figure 9:
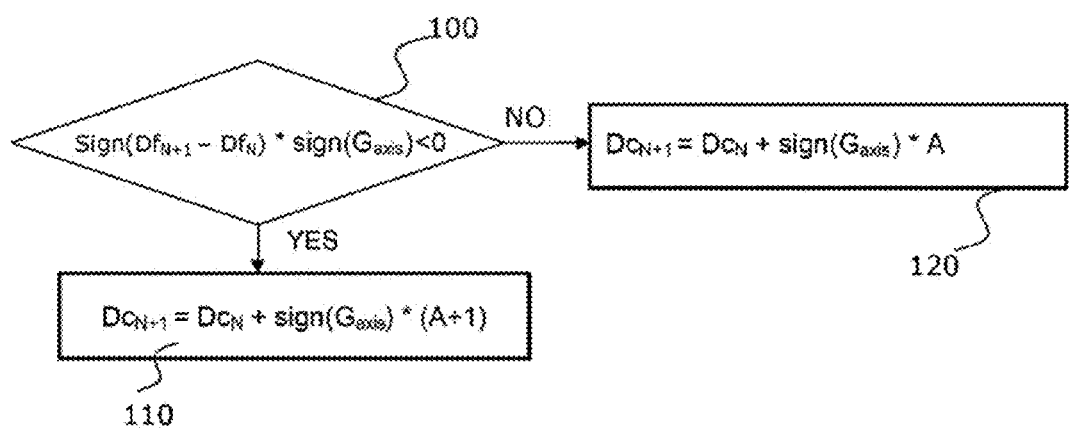
FIG. 9 is a functional block diagram showing the steps of a method in accordance with a first embodiment of the invention.

The device described above enables use of a coarse component determination method that comprises the following steps (see the FIG. 9 functional block diagram).

In the step 100, the determination device 2 determines the sign of the difference between the fine component for a given acquisition cycle and the fine component for the preceding acquisition cycle. The device 2 also determines in the step 110 the sign and the value of the speed of the craft. The device 2 then computes in the step 120 the coarse component corresponding to the given cycle of acquisition of the fine component, as a function of the sign of the difference, and as a function of the sign and of the value of the speed of the craft. The computation may comprise the steps of the algorithm described above and executed by the computer 23.

A first instance of determination of a coarse component is described with reference to FIGS. 4 and 5. In accordance with this first instance, the speed of the moving craft is such that the evolution of the fine component between two computation cycles is less than the least significant bit LSBc of the coarse component. In other words, as shown in FIG. 5, a plurality of acquisition cycles is required for the fine component to go from the value 0 to the value LSBc.

Figure 4:
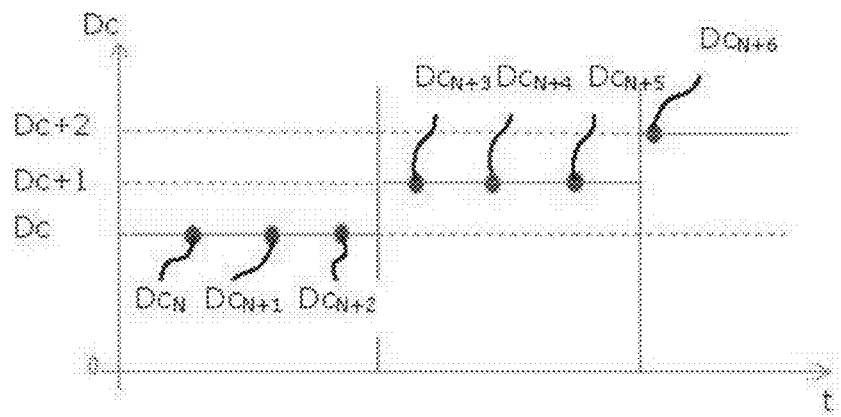
FIGS. 4 and 5 represent the evolution of the coarse component and the fine component, respectively, as a function of the time t when the mobile is moving at a given speed along an axis and the passage of the fine component from the value 0 to the value of the least significant bit of the coarse component necessitates a plurality of cycles of acquisition.
Figure 5:
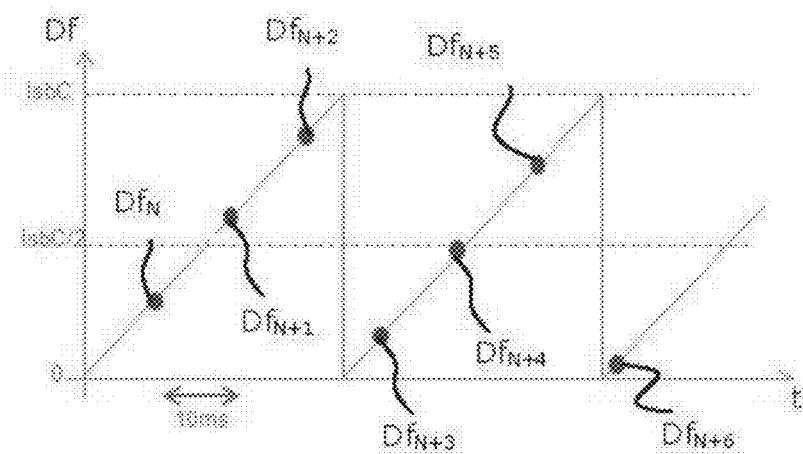

FIGS. 4 and 5 show the evolution of the fine component (FIG. 5) and the coarse component (FIG. 4), for example in longitude, as a function of time. The fine component evolves between 0 and the least significant bit value LSBc of the coarse component.

The points DcN, DcN+2, DcN+4, and DcN+6 and DfN to DfN+6 correspond to the values computed by the computation system 1 and acquired by the user system 3. The points DcN+1, DcN+3 and DcN+5 correspond to the values extrapolated by the determination device 2 of the user system 3.

It is seen in FIG. 4 that for the second cycle the value of the second fine component DfN+1 is greater than the value of the fine component DfN for the preceding cycle. The sign of the speed of the moving craft is considered as positive.

On application of the algorithm described above, the value of the coarse component DcN+1 of the cycle N+1 remains equal to the value of the coarse component DcN of the preceding cycle N. The coarse component extrapolated over the second cycle N+1 is then considered equal to the coarse component measured over the first cycle N. The fine component has in fact not had time during this second cycle N+1 to reach the value of the least significant bit of the coarse component.

It is seen that for the fourth cycle N+3 the value of the fourth fine component DfN+3 is lower than the value of the fine component DfN+2 for the preceding cycle. It is possible to deduce from this that the coarse component for the preceding cycle is no longer valid. In fact, during the third cycle N+2 the value of the fine component reached the value of the least significant bit of the coarse component and then restarted from the value 0. The coarse component extrapolated over the fourth cycle N+3 is then obtained by adding +(A+1), for example 1 in the case of FIG. 4, to the value of the coarse component DcN+2 of the third cycle.

A second instance of determination of a coarse component is described with reference to FIGS. 6 and 7. In accordance with this second instance, the speed of the moving craft is such that the evolution of the fine component between two computation cycles is greater than the least significant bit, denoted LSBc, of the coarse component. In other words, as shown in FIG. 7, one cycle of acquisition of the fine component is sufficient for the fine component to go from the value 0 to the value LSBc.

Figure 6:
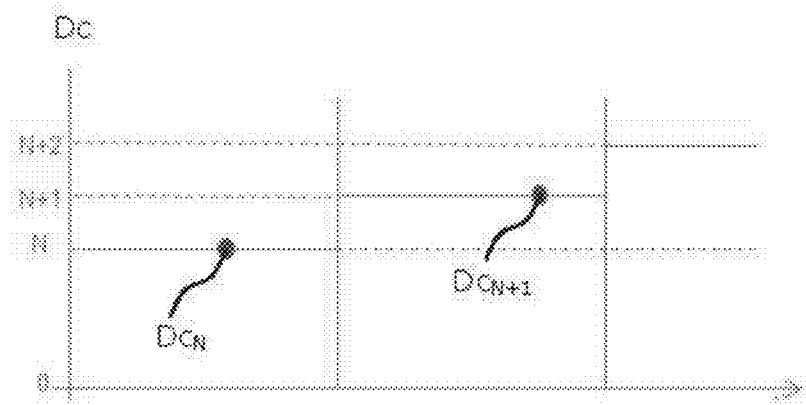
FIGS. 6 and 7 represent the evolution of the coarse component and the fine component, respectively, as a function of the time t when the mobile is moving at a given speed along an axis and the passage of the fine component from the value 0 to the value of the least significant bit of the coarse component necessitates only one acquisition cycle.
Figure 7:
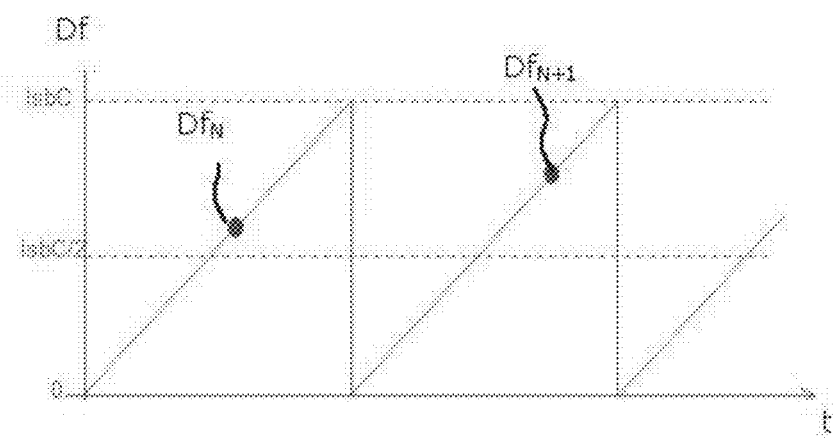

In a manner similar to the first instance, FIGS. 6 and 7 show the evolution of the fine component (FIG. 7) and the coarse component (FIG. 6), for example in longitude, as a function of time. The fine component evolves between 0 and the value of the least significant bit LSBc of the coarse component.

The points DcN, DfN and DfN+1 correspond to the values computed by the computation system 1 and acquired by the device 2 of the user system 3. The point DcN+1 corresponds to a value extrapolated by the device 2 of the user system 3.

It is seen in FIG. 7 that, for the second cycle N+1, the value of the second fine component DfN+1 is greater than the value of the fine component DfN for the preceding cycle. The sign of the speed of the moving craft is considered as positive.

However, the comparison between the speed of the moving craft and the evolution of the fine component over this cycle makes it possible to detect that during the second cycle the fine component is necessarily associated with a coarse component that has to be incremented relative to the coarse component for the first cycle. In fact, for a given speed value Gaxis along an axis, it is known that the fine component must run between two successive computation cycles an integer number of times, corresponding to the parameter A, the range [0; LSBc], A being computed as follows:

A=Ent(|Gaxis/G0|) Ent( ) being the integer part function

As described in detail above, this parameter A is used in the first algorithm to determine the coarse component for a cycle during which it has not been computed by the computation system 1.

The coarse component extrapolated over the second cycle is then obtained by adding +A to the coarse component measured over the first cycle, A being a function of the value of the speed or of the expected evolution of the position over the duration of a cycle, here 10 ms. As explained above, if the speed Gaxis of the moving craft is known, the expected evolution of the position datum is obtained as follows: DtotN+1−DtotN=Gaxis*Te/R0.

The determination device 2 therefore enables correction of the risk of error in the computation of the position datum linked to a possible problem of asynchronism between the computation system 1 that cyclically generates the fine and coarse components of the latitude and longitude positions and the user system 3 that cyclically recombines the fine and coarse components.

Figure 8:
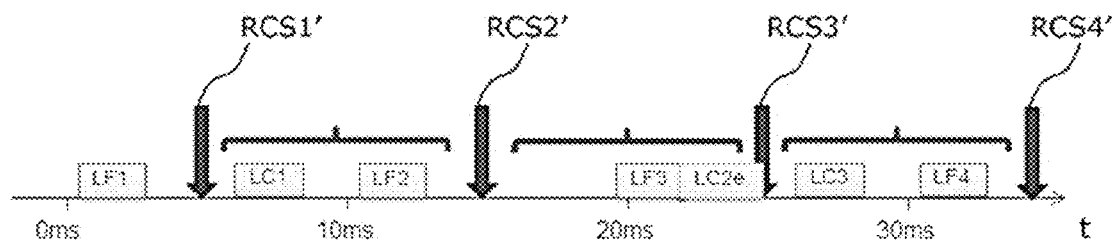
FIG. 8 shows the time axis t and the components from FIG. 2 in the case of recombination of the components asynchronously relative to their acquisition.

FIG. 8 shows a time axis on which are represented fine components, denoted LF1, LF2, LF3, LF4 computed every 10 ms and coarse components LC1 and LC3 computed every 20 ms, together with a coarse component LC2e corresponding to a coarse component extrapolated by the determination device 2 of computation 1, for example by the method described above. The components are longitude position datum components but could also be latitude component data.

Each arrow RCS1', RCS2', RCS3' and RCS4' directed toward the time axis represents an operation of recombination by the user system 3. It is therefore seen that the recombination is effected asynchronously relative to the acquisition of these components. Now the combination of two components not corresponding to the same computation or acquisition cycle runs the risk of inducing an error in the required position value.

The determination device 2 enables this problem to be solved by detecting a combination of incoherent data corresponding to a combination of fine and coarse components coming from different cycles. To this end the determination device 2 is also configured to compare the evolution of the reconstructed position against its expected evolution.

In the event of detection of an incoherent association of a coarse component (extrapolated or not) with a fine component, the determination device 2 applies a correction to the coarse component until a reconstructed position is obtained that is coherent with regard to the expected evolution of the position datum.

The device 2 therefore includes a module 24 for determination of the sign of the difference between the position datum reconstructed for a given reconstruction cycle N+1 and the position datum reconstructed for a preceding reconstruction cycle. The device also includes a module 25 for determination of the sign and of the value of the speed of the craft, similar or identical to the determination module 21.

The device also includes a computer 26 configured to compute the corrected coarse component of the position datum corresponding to the given reconstruction cycle, as a function of the sign of the difference between the position datum reconstructed for the given reconstruction cycle and the position datum reconstructed for the preceding reconstruction cycle, and as a function of the sign and of the value of the speed of the craft.

In accordance with one particular embodiment, the computer 26 of the device 2 is configured to compute the corrected coarse component of the position datum Dtot corresponding to the given reconstruction cycle, denoted N+1, N being a positive integer, by executing a second algorithm comprising the following computations:

$$Dtot\_corrN = Dc\_corrN * LSBc + DfN * LSBf$$
$$DtotN+1 = DcN+1 * LSBc + DfN+1 * LSBf$$
If
$$Sign[(DtotN+1 + \varepsilon*sign(Gaxis)) - (Dtot\_corrN + sign(Gaxis)*Gaxis*Te/R0)]*sign(Gaxis) < 0$$

-continued

```
    OR
        |DtotN+1 + ε*sign(Gaxis) − Dtot_corrN| < |Gaxis * Te / R0|
    Then
        If
            Sign(DfN+1 − DfN) * sign(Gaxis) <0
        Then
            Dc_corrN+1 = DcN+1 + sign(Gaxis) * (A + 1)
        Else
            Dc_corrN+1 = DcN+1 + sign(Gaxis) * A
    Else
        Dc_corrN+1 = DcN+1
```

DfN+1 being the fine component acquired during the cycle N+1 reconstruction;

DfN being the fine component acquired during the cycle N;

DtotN+1 being the reconstructed position estimated in the cycle N+1;

Dtot_corrN being the reconstructed position corrected in the cycle N;

DcN+1 being the coarse component acquired during the cycle N+1 reconstruction;

Dc_corrN being the corresponding corrected coarse component during the cycle N;

Dc_corrN+1 being the corrected coarse component corresponding to the cycle N+1;

Gaxis being the speed of the craft along the south-north axis for the computation of the coarse component of the latitude or along the west-east axis for the computation of the coarse component of the longitude;

sign(Gaxis) being, for the computation of the coarse component of the latitude, equal to +1 when the moving craft is moving from the south toward the north, and equal to −1 otherwise and, for the computation of the coarse component of the longitude, equal to +1 when the moving craft is moving from the west toward the east, and equal to −1 otherwise;

ε being a tolerance value;

A being a positive real value computed as follows:

A=Ent(Gaxis/G0|) Ent( ) being the integer part function

G0=[R0*LSBc]/Te

R0=RT for the computation of a latitude position datum along the south-north axis R0=RT*cos(Latitude) for the computation of a longitude position datum along the west-east axis RT=terrestrial radius LSBf=angular value of the discretization step of the fine component LSBc=angular value of the discretization step of the coarse component Te=period of acquisition of the coarse component The value Dc_corrN+1 computed as output of this second algorithm may be used as an input parameter value DcN of the first algorithm described above.

The position datum is computed as the sum of the fine and coarse components multiplied by the value of their respective least significant bit.

Figure 10:
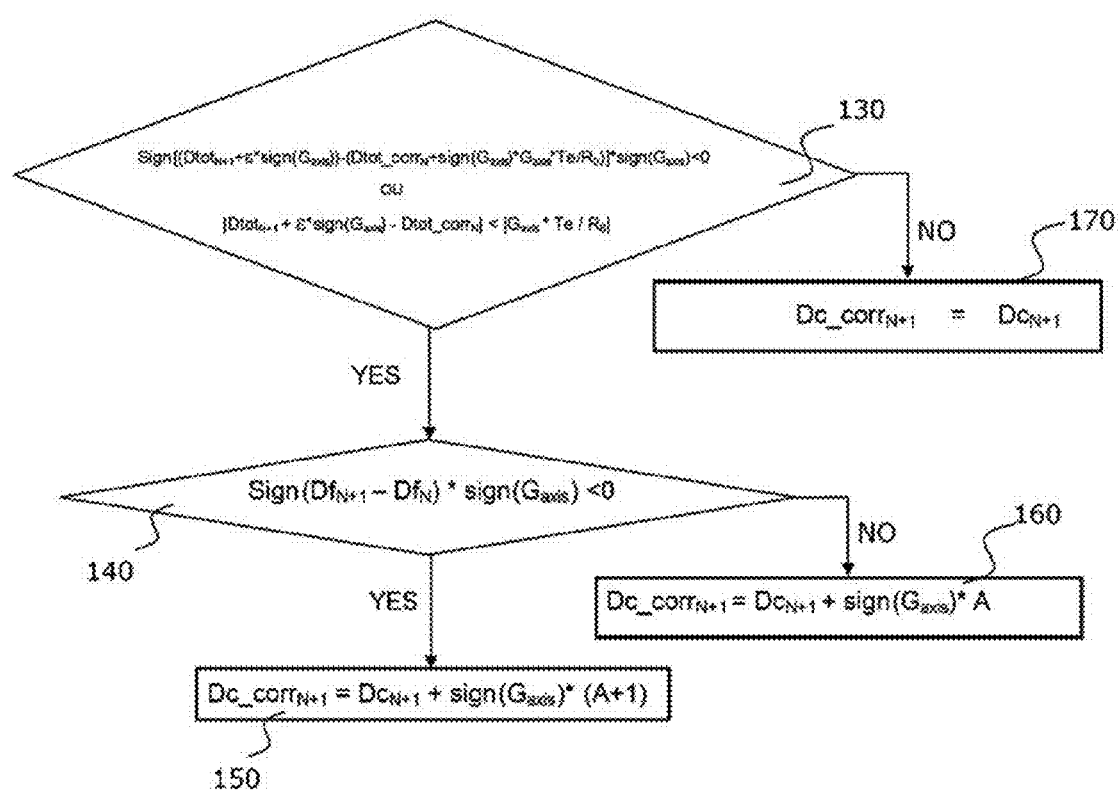
FIG. 10 is a functional block diagram showing the steps of a method in accordance with a second embodiment of the invention additional to the steps of the method shown in FIG. 9.

The device described above enables use of a method for computation of a corrected coarse component of a position datum corresponding to a given reconstruction cycle, which includes the following steps, shown in the FIG. 10 functional block diagram.

In the step 130, the device 2 analyzes the evolution of the position datum taking account of the sign and of the value of the speed of the moving craft by effecting a first conditional test.

$$\text{Sign}[(DtotN+1+\epsilon*\text{sign}(Gaxis))-(Dtot\_corrN+\text{sign}(Gaxis)*Gaxis*Te/R0)]*\text{sign}(Gaxis)<0$$

or $$|DtotN+1+\epsilon*\text{sign}(Gaxis)-Dtot\_corrN|<|Gaxis*Te/R0|$$

If the first test is verified, the device 2 effects in the step 140 a second conditional test on the sign of the evolution of the fine component and the sign of the speed: Sign(DfN+1−DfN)*sign(Gaxis)<0

If this second test is verified then the device 2 computes in the step 150 the corrected coarse component of the position datum corresponding to the given reconstruction cycle in accordance with the formula:

$$Dc\_corrN+1=DcN+1+\text{sign}(Gaxis)*(A+1)$$

If the condition of the second test is not met then the device 2 computes in the step 160 the corrected coarse component of the position datum corresponding to the given reconstruction cycle in accordance with the formula:

$$Dc\_corrN+1=DcN+1+\text{sign}(Gaxis)*A$$

If the conditions of the first test are not met, then the device 2 computes in the step 170 the corrected coarse component of the corresponding position datum as follows:

$$Dc\_corrN+1=DcN+1$$

The person skilled in the art readily understands that the various steps and functions of the embodiments described above may take the form of computer programs. In particular, the steps described above may take the form of electronic and/or computer instructions that can be executed by the device 2. In particular, the functions of the modules 20 to 26 described above may take the form of sets of computer instructions executed by a processor of the device 2.

These computer programs, or computer instructions, may be contained in program storage devices, for example computer-readable digital data storage media, or executable programs. The programs or instructions may also be executed from program storage peripherals.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for determining a coarse component of a position datum of a moving craft, said position datum representing one of a latitude of the moving craft or a longitude of the moving craft, said position datum being reconstructed cyclically in accordance with cycles of reconstruction of the position datum, by combining said coarse component acquired cyclically in accordance with cycles of acquisition of the coarse component, with a corresponding fine component acquired cyclically in accordance with cycles of acquisition of the fine component, comprising:
- an acquisition module configured to acquire said fine component in accordance with cycles of acquisition of the fine component and to acquire the coarse component in accordance with cycles of acquisition of the coarse component, wherein the cycles of acquisition of the fine component are executed at a first frequency, and wherein the cycles of acquisition of the coarse component are executed at a second frequency lower than the first frequency;
- a first determination module configured to determine a sign of a difference between the fine component for a given one of the cycles of acquisition of the fine component and the fine component for the preceding one of the cycles of acquisition of the fine component;
- a second determination module configured to determine a sign and a value of the speed of the moving craft based on speed data from a computation system;
- a computer configured to compute the coarse component corresponding to said given one of the cycles of acquisition of the fine component, as a function of said sign of the difference between the fine component for said given one of the cycles of acquisition of the fine component and the fine component for said preceding one of the cycles of acquisition of the fine component, and as a function of said sign and said value of the speed of the moving craft.

2. The device as claimed in claim 1, wherein the computer is configured to compute the coarse component corresponding to said given one of the cycles of acquisition of the fine component, also as a function of the value of the speed of the moving craft.

3. The device as claimed in claim 1, wherein, for the determination by said device of the coarse component of a latitude position, said second determination module is configured to determine the sign of the speed of the moving craft along the south-north axis.

4. The device as claimed in claim 1, wherein, for the determination by said device of the coarse component of a longitude position, said second determination module is configured to determine the sign of the speed of the moving craft along the west-east axis.

5. The device as claimed in claim 1, wherein the computer is configured to compute the coarse component corresponding to said given one of the cycles of acquisition of the fine component, denoted N+1, N being a positive integer, in accordance with a first algorithm comprising the following computations:

---
If
  Sign(DfN+1 − DfN) * sign(Gaxis) <0
Then
  DcN+1 = DcN + sign(Gaxis) * (A + 1)
Else
  DcN+1 = DcN + sign(Gaxis) * A
---

DfN+1 being the fine component acquired in the cycle N+1 of acquisition of the fine component;
DfN being the fine component acquired in the cycle N of acquisition of the fine component;
DcN+1 being the coarse component corresponding to the fine component acquired in the cycle N+1 of acquisition of the fine component;
DcN being the coarse component corresponding to the fine component acquired in the cycle N of acquisition of the fine component;
Gaxis being the speed of the craft along the south-north axis for the computation of the coarse component of the latitude or along the west-east axis for the computation of the coarse component of the longitude;
sign(Gaxis) being, for the computation of the coarse component of the latitude, equal to +1 when the moving craft is moving from the south toward the north, and equal to −1 otherwise and, for the computation of the coarse component of the longitude, equal to +1 when the moving craft is moving from the west toward the east, and equal to −1 otherwise;
A being a positive real value computed as follows:
A=Ent(|Gaxis/G0|) Ent( ) being the integer part function
G0=[R0*LSBc]/Te
R0=RT when the datum is the latitude position along the south-north axis
R0=RT*cos(Latitude) when the datum is the longitude position along the west-east axis
RT=terrestrial radius
LSBc=angular value of the step for discretization of the coarse component
Te=period of acquisition of the coarse component.

6. The device as claimed in claim 5, wherein the device includes a third determination module configured to determine the value A as a function of the value of the speed of the moving craft.

7. The device as claimed in claim 1, wherein said device includes a computer configured to compute a corrected coarse component of the position datum corresponding to said given reconstruction cycle, as a function of the difference between the position datum reconstructed for said given reconstruction cycle and the corrected reconstructed position for said preceding reconstruction cycle, and as a function of said sign of the speed of the moving craft.

8. The device as claimed in claim 7, wherein the computer is configured to compute the corrected coarse component of the position corresponding to said given reconstruction cycle, denoted N+1, N being a positive integer, in accordance with a second algorithm comprising the following computations:

---
Dtot_corrN = Dc_corrN * LSBc + DfN * LSBf
DtotN+1 = DcN+1 * LSBc + DfN+1 * LSBf
If
  Sign[(DtotN+1 + ε*sign(Gaxis)) − (Dtot_corrN + sign(Gaxis)*Gaxis*Te/R0)]*sign(Gaxis)<0
    OR
  |DtotN+1 + ε*sign(Gaxis) − Dtot_corrN| < |Gaxis * Te / R0|
Then
If
  Sign(DfN+1 = DfN) * sign(Gaxis) <0
Then
  Dc_corrN+1 = DcN+1 + sign(Gaxis) * (A + 1)
Else
  Dc_corrN+1 = DcN+1 + sign(Gaxis) * A
Else
  Dc_corrN+1 = DcN+1
---

DfN+1 being the fine component acquired during the reconstruction cycle N+1;
DfN being the fine component acquired during the cycle N of reconstruction;
DtotN+1 being the reconstructed position estimated in the cycle reconstruction N+1;

Dtot_corrN being the reconstructed position corrected in the reconstruction cycle N;

DcN+1 being the coarse component acquired during the reconstruction cycle N+1 reconstruction;

Dc_corrN being the corresponding coarse component corrected during the reconstruction cycle N;

Dc_corrN+1 being the corrected coarse component corresponding to the reconstruction cycle N+1;

$\epsilon$ being a tolerance value;

Gaxis being the speed of the moving craft along the south-north axis for the computation of the coarse component of the latitude or along the west-east axis for the computation of the coarse component of the longitude;

sign(Gaxis) being, for the computation of the coarse component of the latitude, equal to +1 when the moving craft is moving from the south toward the north, and equal to −1 otherwise and, for the computation of the coarse component of the longitude, equal to +1 when the moving craft is moving from the west toward the east, and equal to −1 otherwise;

A being a positive real value
A=Ent(|Gaxis/G0|) Ent( ) being the integer part function
G0=[R0*LSBc]/Te
R0=RT for the computation of the latitude position datum along the south-north axis
R0=RT*cos(Latitude) for the computation of the longitude position datum along the west-east axis
RT=terrestrial radius
LSBf=angular value of the fine component discretization step
LSBc=angular value of the coarse component discretization step
Te=coarse component acquisition period.

9. The device as claimed in claim 8, wherein the device includes a determination module configured to determine the value A as a function of the value of the speed of the moving craft.

10. A system for a moving craft comprising:
a computation system configured to compute cyclically a coarse component of a position datum of the moving craft, and to compute cyclically a corresponding fine component of the position datum, said position datum being one of a latitude position or a longitude position of the moving craft, and,
a determination device for determining the coarse component of the position datum of the moving craft, said position datum being reconstructed cyclically in accordance with cycles of reconstruction of the position datum, by combining said coarse component acquired cyclically in accordance with cycles of acquisition of the coarse component, with a corresponding fine component acquired cyclically in accordance with cycles of acquisition of the fine component, said determination device comprising:
an acquisition module configured to acquire said fine component from said computation system in accordance with cycles of acquisition of the fine component and to acquire said coarse component from said computation system in accordance with cycles of acquisition of the coarse component, wherein the cycles of acquisition of the fine component are executed at a first frequency, and wherein the cycles of acquisition of the coarse component are executed at a second frequency lower than the first frequency;
a first determination module configured to determine a sign of a difference between the fine component for a given one of the cycles of acquisition of the fine component and the fine component for the preceding one of the cycles of acquisition of the fine component;
a second determination module configured to determine a sign and a value of the speed of the moving craft based on speed data from the computation system;
a computer configured to compute the coarse component corresponding to said given cycle of acquisition of the fine component, as a function of said sign of the difference between the fine component for said given one of the cycles of acquisition of the fine component and the fine component for said preceding one of the cycles of acquisition of the fine component, and as a function of said sign and said value of the speed of the moving craft.

11. The system as claimed in claim 10, wherein the computation system is configured to encode the coarse and fine components in a binary format, so that the fine component evolves between zero and the least significant bit of the coarse component.

12. A method performed by a processor for determining a coarse component of a position datum of a moving craft, said position datum being one of a latitude position or a longitude position of the moving craft, comprising the steps:
reconstructing said position datum cyclically in accordance with cycles of construction of the position datum by combining said coarse component acquired cyclically in accordance with cycles of acquisition of the coarse component, with a corresponding fine component acquired cyclically in accordance with cycles of acquisition of the fine component,
acquiring said fine component in accordance with cycles of acquisition of the fine component and acquiring the coarse component in accordance with cycles of acquisition of the coarse component, wherein the cycles of acquisition of the fine component are executed at a first frequency, and wherein the cycles of acquisition of the coarse component are executed at a second frequency lower than the first frequency;
determining a sign of a difference between the fine component for a given one of the cycles of acquisition of the fine component and the fine component for a preceding one of the cycles of acquisition of the fine component;
determining the sign and of the value of the speed of the moving craft based on speed data from a computation system; and
computing the coarse component corresponding to said given one of the cycles of acquisition of the fine component, as a function of said sign of said difference, and as a function of said sign and of said value of the speed of the moving craft.

13. The method as claimed in claim 12, wherein, for the correction of a coarse component of a position datum corresponding to a given reconstruction cycle, said method further includes the computation of said corrected coarse component, as a function of the difference between the position datum reconstructed for said given reconstruction cycle and the reconstructed position corrected for said preceding reconstruction cycle, and as a function of said sign and of the value of the speed of the moving craft.

* * * * *